United States Patent [19]
Lee

[11] Patent Number: 5,799,489
[45] Date of Patent: Sep. 1, 1998

[54] TORQUE COMPENSATING APPARATUS AND METHOD FOR A TURBO-CHARGER

[75] Inventor: Jun Yeop Lee, Ulsan, Rep. of Korea

[73] Assignee: Hyundai Motor Company, Ltd., Seoul, Rep. of Korea

[21] Appl. No.: 672,568

[22] Filed: Jun. 28, 1996

[51] Int. Cl.$^6$ .................................................... F02B 37/00
[52] U.S. Cl. .................................................. 60/597; 60/605.1
[58] Field of Search .............................. 60/280, 294, 304, 60/605.1, 606, 597

[56] References Cited

U.S. PATENT DOCUMENTS

| | | |
|---|---|---|
| 4,373,336 | 2/1983 | Horler et al. |
| 4,391,098 | 7/1983 | Kosuge. |
| 4,404,804 | 9/1983 | Tadokoro et al. |
| 4,467,606 | 8/1984 | Chaffiotte. |
| 4,909,035 | 3/1990 | Tadokoro et al. |
| 4,993,228 | 2/1991 | Tashima et al. |
| 5,214,919 | 6/1993 | Jiewertz et al. |
| 5,408,979 | 4/1995 | Backlund et al. |
| 5,425,239 | 6/1995 | Gobert. |

FOREIGN PATENT DOCUMENTS

| | | | |
|---|---|---|---|
| 654685 | 8/1935 | Germany | 60/294 |
| 57-59017 | 4/1982 | Japan | 60/606 |
| 58-119922 | 7/1983 | Japan | 60/606 |

*Primary Examiner*—Michael Koczo

[57] ABSTRACT

A torque compensating apparatus and method for a turbocharger, includes a sensor for detecting a crank angle of a crank, a control unit for generating a control signal according to the detection, a compressing mechanism for selectively generating pressure toward a turbine, and a switch circuit for selectively activating the compressing mechanism according to the control signal so as to continuously rotate the turbine even during an intake stroke.

20 Claims, 2 Drawing Sheets

5,799,489

TORQUE COMPENSATING APPARATUS AND METHOD FOR A TURBO-CHARGER

BACKGROUND OF INVENTION

1. Field of the Invention

The present invention relates to a torque compensating apparatus and method for a turbo-charger of a four stroke cycle engine in a vehicle, and more particular to a torque compensating apparatus and method for a turbo-charger including a compression mechanism for applying torque onto a turbine and rotating a blower connected to the turbine during an intake stroke.

2. Description of Related Art

Generally, a turbo-charger includes a turbine rotating due to an exhaust gas, and a blower disposed on one end of a shaft connected to the turbine for moving the air compressed thereby. An exhaust gas from the engine enters an exhaust manifold and passes through the turbine case so as to rotate fast the turbine.

At this time, however, the blower connected to the turbine also rotates fast and takes in the air through the intake inlet and, by converting speed energy to pressure energy, the air is transferred to an intake manifold. As a result, the amount of intake air increases as the amount of exhaust gas increases, which enhances engine power. However, in such conventional engine systems, a turbo-charger operate only during an exhaust stroke and not during an intake stroke. In fact, such a turbo-charger causes problems of interfering with the intake operation during an intake stroke.

Referring to FIG. 2, generally, an exhaust stroke is carried out during a C-range (236 degrees). That is, an exhaust valve opens at 43 degrees from a BTDC (Before Top Dead Center) and closes at 13 degrees from a ATDC (After Top Dead Center). On the other hand, an intake stroke is carried out during a D-range (235 degrees). That is, an intake valve opens at 10 degrees from the ATDC and closes at 45 degrees from the BTDC. Therefore, during a non-overlapping E-range (124 degrees), the turbo-charger is not operated, which reduces the amount of air being intaken in the intake channel.

Moreover, when the exhaust valve is closed, a back flow occurs within an exhaust manifold disposed between a turbine and an exhaust valve, which prevents a generation of torques on the turbine.

SUMMARY OF THE INVENTION

Accordingly, it is an object of the present invention to provide a torque compensating apparatus and method for an internal Combustion engine of a vehicle, which eliminates the above problems encountered with conventional turbo-charger systems.

Another object of the present invention is to provide an apparatus and method for compensating torque in a turbo-charger, including a compression mechanism for continuously generating torque on a turbine during both an exhaust stroke and an intake stroke.

A further object of the present invention is directed to an apparatus and method for compensating torque for a turbo-charger, including a crank angle sensor for detecting an angle of a crank, an electronic control unit for generating an output signal responsive to a detection signal from the crank angle sensor, a switch circuit for generating a switching signal in response to the output signal from the electronic control unit, a pair of solenoids disposed on an exhaust manifold for alternatively inducing electromagnetism in response to the switching signal so as to reciprocatively move a piston within the exhaust manifold and compress air therewithin toward the turbine for continuously rotating the turbine even during an intake stroke.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a torque compensating apparatus for a turbo-charger, including sensor means for detecting a crank angle of a crank, control means for generating a control signal according to the detection, compression means for selectively generating pressure toward a turbine, and switch means for selectively operating the compression means according to the control signal generated by the control means so as to continuously rotate the turbine even during an intake stroke.

Furthermore, the present invention is directed to a torque compensating method for a turbo-charger, including the steps of detecting a crank angle of a crank, generating a control signal according to the detection, and selectively generating pressure toward a turbine according to the control signal so as to continuously rotate the turbine even during an intake stroke.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
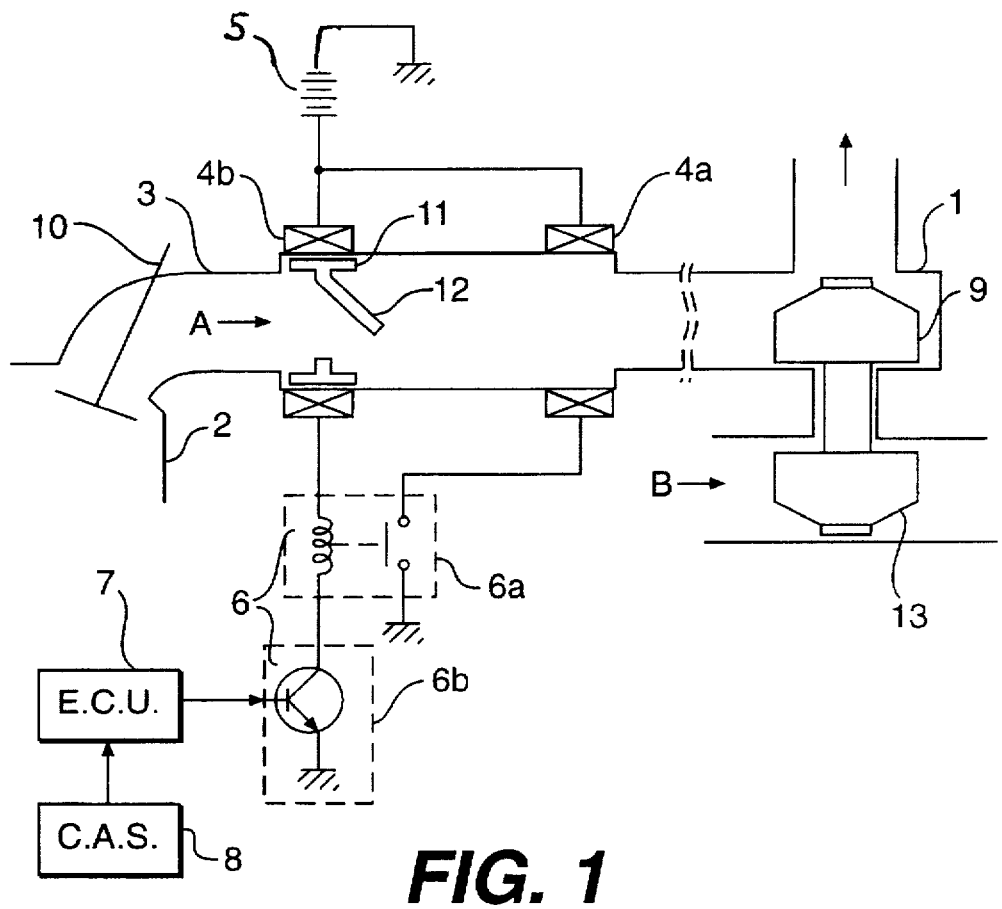
FIG. 1 is a prospective view of a torque compensating apparatus for a turbo-charger of a vehicle during an exhaust stroke, in accordance with the embodiments of the present invention.
Figure 3:
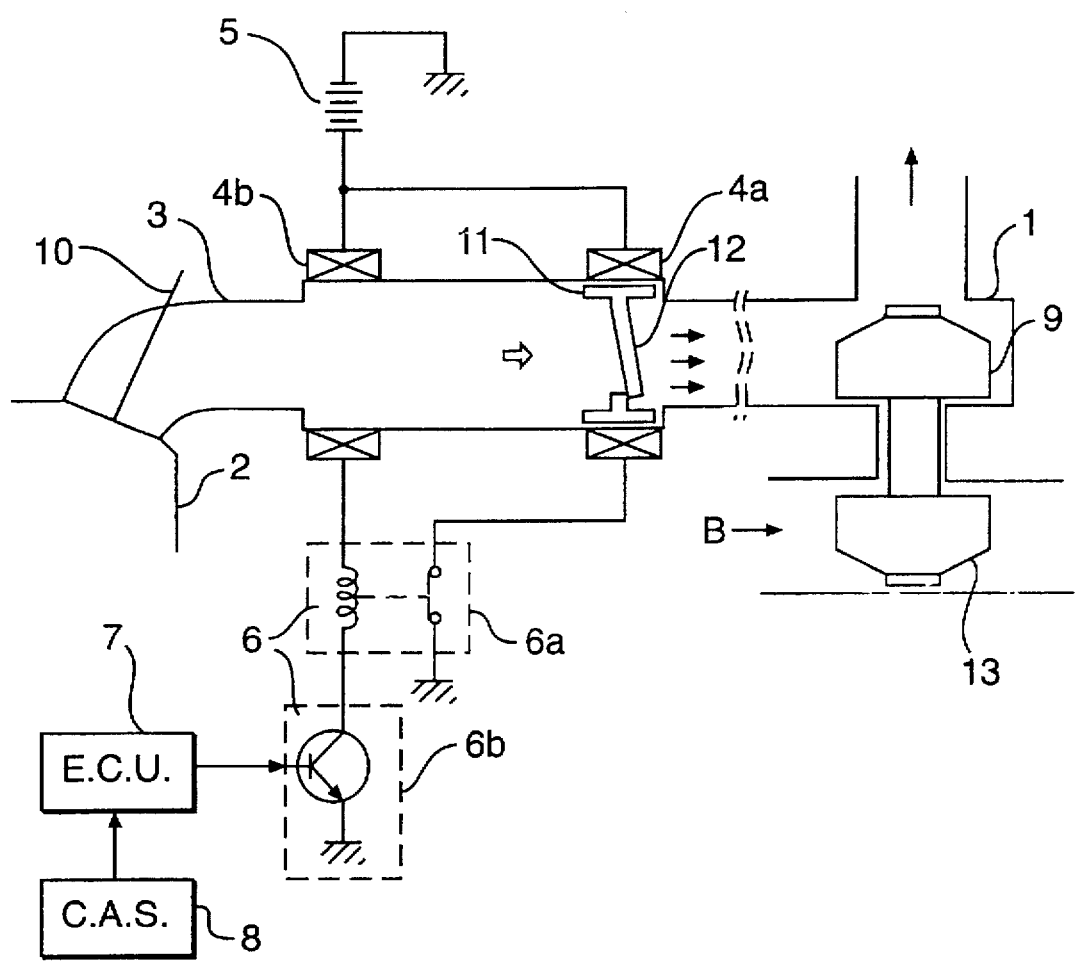
FIG. 3 is the torque compensating apparatus during an intake stroke in accordance with the embodiments of the present invention.

Referring now in detail to the drawings for the purpose of illustrating preferred embodiments of the present invention, the torque compensating apparatus of the present invention as shown in FIGS. 1 and 3, for example, includes an exhaust manifold 3 disposed between a turbine case 1 and a cylinder 2, and first and second solenoids 4a and 4b having a predetermined distance therebetween and disposed on the exhaust manifold 3. The two ends of the first and second solenoids 4a and 4b are connected to both terminals of a battery 5 and the other ends of the solenoids 4a and 4b are connected to a switch circuit 6.

The switch circuit 6 includes a relay 6a and a power transistor 6b. One terminal of the first solenoid 4a is connected to a switch of the relay 6a and one terminal of second solenoid 4b is connected to a coil of the relay 6a. The coil of the relay 6a is connected selectively to the switch of the relay 6a and to the collector of the power transistor 6b, whereas the base of the power transistor 6(b) is connected to an electronic control unit 7 (E.C.U.).

The E.C.U. 7 is also connected to a crank angle sensor 8 for receiving a detection signal therefrom. The crank angle sensor 8 is used, for example, in an MPI (multi-point injection) engine wherein a pulse signal is used to detect a crank angle of a crank.

Accordingly, under the control of the switch circuit 6, the first and second solenoids 4a and 4b are alternatively activated such that when the first solenoid 4a is activated, a piston 11 is moved to the first solenoid 4a so as to move the remaining exhaust gas to the turbine 9. On the other hand, when the second solenoid 4b is activated, the piston 11 is moved toward an exhaust valve 10 so as to maintain an exhaust channel.

Therefore, the piston 11 of a conducting type is reciprocatively moved within the exhaust manifold 3 by the electromagnetism induced by the first and second solenoids 4a and 4b. The piston 11 integrally includes a check valve 12.

Figure 2:
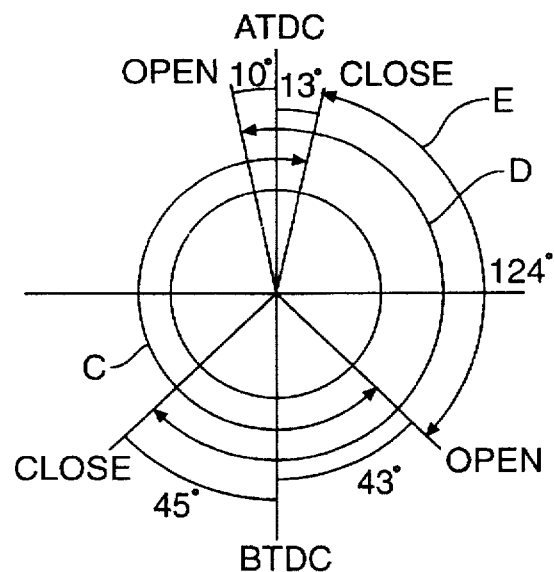
FIG. 2 is a graphic diagram for explaining a valve operation of a 4-stroke cycle engine.

As explained above, referring to FIG. 2, an exhaust stroke is performed during the C-range (236 degrees) and the intake stroke is performed during the D-range (235 degrees). Thus, during the E-range, the first solenoid 4a is activated to compress the air within the exhaust manifold 3 toward the turbine 9 so as to apply torque on the turbine and thus rotate the blower 13 connected thereto. Then the second solenoid 4(b) is activated during the C-range to move the piston 11 away from the turbine 9 so that the exhaust gas rotates the turbine 9. Therefore, the turbine 9 is continuously rotated during both the exhaust and intake strokes.

Accordingly, the E.C.U. 7 generates a control signal based on a detection signal generated from the crank angle sensor 8. The control signal of the E.C.U. 7 controls which solenoid is to be activated. In other words, the E.C.U. 7 starts to generate the control signal at the 43 degrees from the BTDC and ends the signal at 13 degrees from the ATDC.

Referring to FIGS. 1 and 3, the torque compensating apparatus according to the embodiments of the present invention operates as follows.

As shown in FIG. 1, during the C-range, the exhaust valve 10 is opened and the piston 11 cooperates with the second solenoid 4b. At this time, the check valve 12 is opened such that the exhaust gas passing through the exhaust manifold 3 allows the turbine 9 and the blower 13 connected thereto to rotate.

Then, the E.C.U. 7 calculates a time at which a control signal should be generated based on a detection signal from the crank angle sensor 8 and generates the control signal. When the control signal from the E.C.U. 7 is generated, a voltage applied to the base of the power transistor 6b increases and a collector current flows to turn OFF the switch of the relay 6a.

This causes the electricity to flow only through the second solenoid 4b and moves the piston 11 toward the second solenoid 4b. During the time the exhaust valve 10 remains open, the check valve 12 remains open as well due to the pressure applied by the exhaust gas, and torque is applied to the turbine 9.

Referring to FIG. 3, thereafter, at 13 degrees from the ATDC the E.C.U. 7 stops generating the control signal which prevents the collector current to flow through the transistor 6b. This deactivates the second solenoid 4b and, at the same time, the switch of the relay 6a is turned ON so as to activate the first solenoid 4a.

Then, the piston 11 is moved to the first solenoid 4a by the induced electromagnetism. Since, at this time the exhaust valve 10 is closed, the exhaust gas is not output and the check valve 12 as closed moves to the right toward the first solenoid 4a, and the air within the exhaust manifold 3 is compressed toward the turbine 9. Due to this compression force, even though the exhaust valve 10 is closed, torque is applied to the turbine 9 and the turbine 9 continuously rotates during the intake stroke. Therefore, even during the intake stroke, the blower 13 connected to the turbine 9 is continuously rotated and moves the intake air to the cylinder 2.

Accordingly, the present invention includes a E.C.U. for generating an output signal only during an exhaust stroke to provide an exhaust gas passage and to apply pressure toward a turbine during an intake stroke, whereby the torque for a turbo-charger is continuously generated, the effectiveness of the turbo-charger during the intake stroke is increased, and the engine power is greatly enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque compensating apparatus for an internal combustion engine including a crank, a turbine and an exhaust manifold, comprising:

sensor means for detecting a crank angle of the crank;

control means for generating a control signal according to the detection;

compression means for selectively generating pressure toward the turbine; and switch means for selectively operating the compression means according to the control signal generated by the control means so as to continuously rotate the turbine even during an intake stroke of the engine, wherein the compression means includes, a first solenoid and a second solenoid connected to each other for selectively being activated by the switch means, and a piston controlled by the first and second solenoids.

2. An apparatus of claim 1, wherein the switch means includes:

a relay connected to the second solenoid, a switch connected to the first solenoid, and a transistor connected to the relay and the control means.

3. An apparatus of claim 1, wherein the control means generates the control signal during a predetermined period according to the detection by the sensor means.

4. An apparatus of claim 3, wherein the predetermined period includes a time period in which the intake stroke is carried out.

5. An apparatus of claim 3, wherein the predetermined period is approximately between 13 degrees from ATDC and 43 degrees from BTDC.

6. An apparatus of claim 2, wherein, when the control signal is generated, the switch is turned off and the second solenoid is activated.

7. An apparatus of claim 2, wherein, when the control signal is not generated, the switch is turned on and the first solenoid is activated.

8. An apparatus of claim 2, wherein the piston is moved between the first and second solenoids according to the control signal generated by the control means, the piston including a check valve.

9. An apparatus of claim 8, wherein when the first solenoid is activated, the piston and the check valve as closed move toward the turbine so as to generate torque on the turbine and thus rotate a blower connected to the turbine.

10. An apparatus of claim 1, further comprising:

a power source for supplying power to the compression means.

11. An apparatus of claim 2, wherein the first and second solenoids are disposed on the exhaust manifold for moving gas therethrough.

12. A torque compensating method for an internal combustion engine including a crank, a turbine and an exhaust manifold, comprising the steps of:

detecting a crank angle of the crank;

generating a control signal according to the detection; and selectively generating pressure toward the turbine according to the control signal so as to continuously rotate the turbine even during an intake stroke of the engine, wherein the selectively generating step includes the steps of, providing a first solenoid and a second solenoid on the exhaust manifold for selectively being activated according to the control signal, and providing a piston controlled by the first and second solenoids.

13. A method of claim 12, wherein the step generating the control signal includes the steps of:

connecting a relay to the second solenoid, connecting a switch to the first solenoid, and connecting a transistor to the relay and a control unit.

14. A method of claim 12, wherein the control signal is generated during a predetermined period including a time period in which the intake stroke is carried out.

15. A method of claim 14, wherein the predetermined period is approximately between 13 degrees from a ATDC and 43 degrees from a BTDC.

16. A method of claim 13, wherein when the control signal is generated, the switch is turned off and the second solenoid is activated.

17. A method of claim 12, wherein the selectively generating step includes the step of:

moving the piston within the exhaust manifold between the first and second solenoids according to the control signal, the piston including a check valve.

18. A method of claim 17, wherein the selectively generating step includes the steps of:

activating the first solenoid when no control signal is generated, moving the piston and the check valve as closed toward the turbine, and generating torque on the turbine by the movement of the piston and the check valve and rotating the turbine and a blower connected to the turbine accordingly.

19. A torque compensating apparatus for an internal combustion engine including a crank, a turbine, and an exhaust manifold, comprising:

sensor means for detecting a crank angle of the crank;

control means for generating a control signal according to the detection;

compression means for selectively generating pressure toward the turbine; and switch means for selectively operating the compression means according to the control signal generated by the control means so as to continuously rotate the turbine even during an intake stroke of the engine, wherein the control means generates the control signal during a predetermined period according to the detection by the sensor means, the predetermined period including a time period in which the intake stroke is performed.

20. A torque compensating method for an internal combustion engine including a crank, a turbine, and an exhaust manifold, comprising steps of:

detecting a crank angle of the crank;

generating a control signal according to the detection;

selectively generating pressure toward the turbine according to the control signal so as to continuously rotate the turbine even during an intake stroke of the engine, wherein the control signal is generated during a predetermined period including a time period in which the intake stroke is performed.

* * * * *